M. BRONNUM.
BERMUDA GRASS CUTTER.
APPLICATION FILED JUNE 2, 1919.

1,349,809.

Patented Aug. 17, 1920.

Inventor
Marinus Bronnum
by Graham + Davis
Attorneys

UNITED STATES PATENT OFFICE.

MARINUS BRONNUM, OF SOUTH PASADENA, CALIFORNIA.

BERMUDA-GRASS CUTTER.

1,349,809.

Specification of Letters Patent.   Patented Aug. 17, 1920.

Application filed June 2, 1919. Serial No. 301,339.

*To all whom it may concern:*

Be it known that I, MARINUS BRONNUM, a citizen of the United States, residing at South Pasadena, in the county of Los Angeles, State of California, have invented a new and useful Bermuda-Grass Cutter, of which the following is a specification.

My invention is used for the purpose of eradicating Bermuda grass from lawns. This grass, which is common in California and other places, is very troublesome, as it sends out long runners which take root at intervals and so choke out the more desirable forms of grass. It is common practice in California to rake the Bermuda grass up by hand, thereafter cutting off the raised runners. The raking of a lawn to check the growth of Bermuda grass is a very laborious and therefore expensive operation and is not entirely successful, although it tends to reduce the amount of such grass being formed.

My invention comprises an attachment to be secured to an ordinary lawn mower for the purpose of raking up the runners of Bermuda grass whenever the lawn is cut. It is of course not possible to cut all of the runners each time, but as it is necessary to cut lawns at least once a week and as at every cutting certain of the runners are caught and cut off, I have found that my method is much more effective than mere thorough hand rakings at widely separated intervals.

A further object of my invention is to provide an attachment for a lawn mower which is very simple and cheap and which will carry out the above outlined purposes.

Figure 1:
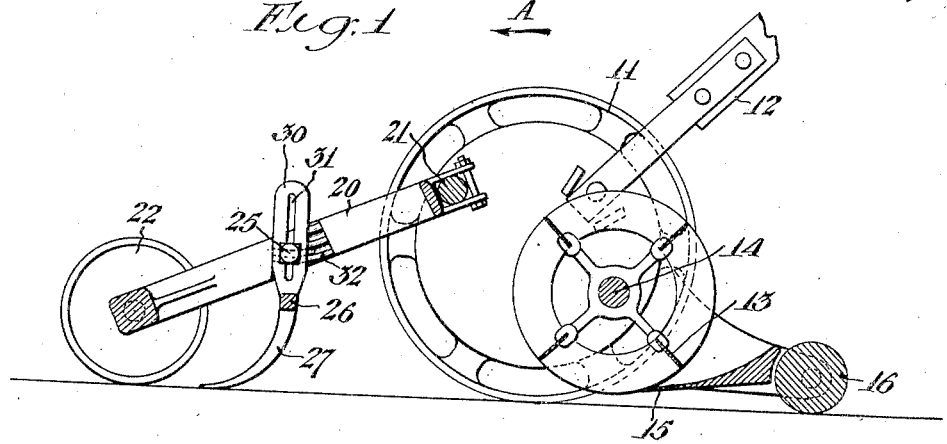
Figure 2:
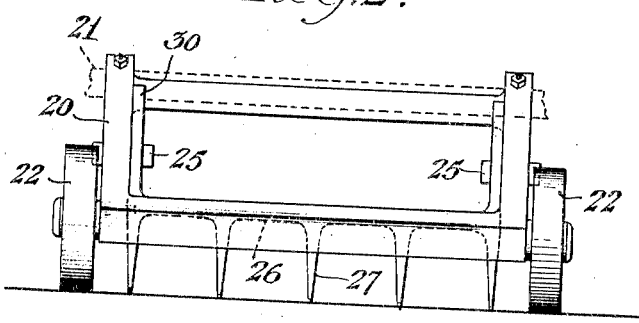
Figure 3:
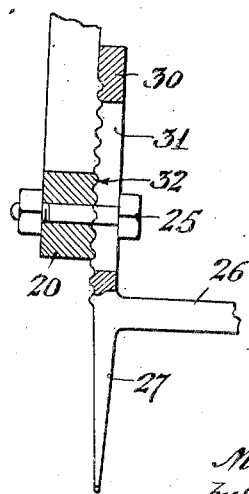

Referring to the drawings, which are for illustrative purposes only, Figure 1 is a side elevation partly in section showing the method of attaching my invention to an ordinary lawn mower. Fig. 2 is a front view of this attachment, and Fig. 3 is an enlarged section through the adjusting joint.

In the form of the invention illustrated in these drawings a lawn mower 11 is provided, being forced in the direction of the arrow A by means of a handle 12. This mower is provided with rotary cutting knives 13 turning about a shaft 14, and coöperating with a fixed knife 15, held in the proper relationship to the ground by means of a roller 16. My attachment comprises a frame 20, which is loosely secured to a bar 21 commonly found on the front of all lawn mowers, the frame 20 being free to swing around the bar 21 and being guided at its forward end by two wheels 22, which rest upon and follow the contour of the ground.

Secured inside the frame 20 by means of bolts 25 is a rake bar 26 carrying rake teeth 27. These teeth 27 are preferably curved as shown. The rake bar 26 is provided with upwardly extending members 30, having slots 31 therein, through which the bolts 25 pass, the bolts 25 locking the members 30 against the sides of the frame 20. For the purpose of providing a vertical and angular inner surface the frame 20 is corrugated as shown at 32, these corrugations forming the arc of a circle, similar corrugations being formed in the members 30, the corrugations on the members 30 and on the frame 20 coöperating to hold the rake teeth in position.

The method of operation is as follows: Parts being in the position shown and the lawn mower being pushed forward in the direction of the arrow A, the rake teeth 27 are so set that they just touch the ground passing between the blades of grass and catching from time to time on any runners of Bermuda grass which may be present. Whenever this occurs the runnner is caught by the teeth 27 and thrown up in a position where it is caught between the knife 15 and one of the knives 13. It is of course obvious that many runners will not be caught, but by mowing the lawn alternately in directions at angles to each other, I have found that eventually practically all of the runners will be caught and cut.

I have further found that where the runners are kept down that almost any of the ordinary grasses have sufficient vitality to choke out the Bermuda grass, so that eventually the amount of Bermuda grass in a lawn can be greatly reduced by using my invention practically without additional labor or attention, as my invention works automatically when applied to a lawn mower and requires very little more power to drive it.

I claim as my invention:

1. In combination a pair of lawn mower wheels; a handle by means of which said wheels are driven over the ground; fixed knife; a main frame carrying said fixed knife said wheels being pivoted in said frame; a roller pivoted in said frame in such a position as to support said fixed knife just above a surface on which said wheels and roller rests; a rotary knife driven by said wheels and coöperating with said fixed knife to cut the grass upon which the mower is operated; an auxiliary frame pivoted to said main frame and extending forwardly therefrom; wheels for supporting the forward end of said auxiliary frame; and rake teeth carried by said auxiliary frame.

2. In combination a pair of lawn mower wheels; a handle by means of which said wheels are driven over the ground; a fixed knife, a main frame carrying said fixed knife said wheels being pivoted in said frame; a roller pivoted in said frame in such a position as to support said fixed knife just above a surface on which said wheels and roller rests; a rotary knife driven by said wheels and coöperating with said fixed knife to cut the grass upon which the mower is operated; an auxiliary frame pivoted to said main frame and extending forwardly therefrom; wheels for supporting the forward end of said auxiliary frame; and rake teeth adjustably secured in said auxiliary frame in such a position that they will slide under and lift Bermuda grass runners into a position to be cut by said knives.

In testimony whereof, I have hereunto set my hand at Los Angeles, California, this 27th day of May, 1919.

MARINUS BRONNUM.